United States Patent
Han et al.

(10) Patent No.: US 8,652,680 B2
(45) Date of Patent: Feb. 18, 2014

(54) SECONDARY BATTERY

(75) Inventors: Minyeol Han, Yongin-si (KR);
Jeongwon Oh, Yongin-si (KR);
Sangwon Byun, Yongin-si (KR);
Dukjung Kim, Yongin-si (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 88 days.

(21) Appl. No.: 13/469,233

(22) Filed: May 11, 2012

(65) Prior Publication Data
US 2013/0115488 A1 May 9, 2013

(30) Foreign Application Priority Data
Nov. 9, 2011 (KR) .................. 10-2011-0116539

(51) Int. Cl.
*H01M 2/26* (2006.01)
*H01H 37/76* (2006.01)

(52) U.S. Cl.
USPC ............ 429/161; 429/163; 429/164; 336/401

(58) Field of Classification Search
None
See application file for complete search history.

(56) References Cited

U.S. PATENT DOCUMENTS

| 8,507,126 B2 * | 8/2013 | Byun ........................ 429/161 |
| 2010/0266879 A1 | 10/2010 | Byun et al. |
| 2011/0200849 A1 | 8/2011 | Byun et al. |

FOREIGN PATENT DOCUMENTS

| KR | 10-2010-0116028 A | 10/2010 |
| KR | 10-2011-0095101 A | 8/2011 |

* cited by examiner

*Primary Examiner* — Cynthia K. Walls
(74) *Attorney, Agent, or Firm* — Lee & Morse, P.C.

(57) ABSTRACT

A secondary battery includes an electrode assembly including a first electrode plate, a second electrode plate, and a separator between the first electrode plate and the second electrode plate; a first collector electrically connected to the first electrode plate, the first collector including a fuse part; a case accommodating the electrode assembly and the first collector; a cap plate sealing an opening of the case and electrically connected to the first collector, the cap plate including a short circuit hole, the short circuit hole being adjacent to the fuse part; a first short circuit member in the short circuit hole; and a second short circuit member spaced apart from a top surface of the cap plate and electrically connected to the second electrode plate, at least a portion of the second short circuit overlapping the first short circuit member.

20 Claims, 5 Drawing Sheets

SECONDARY BATTERY

BACKGROUND

1. Field

Embodiments relate to a secondary battery.

2. Description of the Related Art

Unlike primary batteries, which are not chargeable, secondary batteries are chargeable and dischargeable. Low-capacity batteries, which include a pack having one battery cell, are used for small portable electronic products, such as cellular phones, camcorders, and the like. High-capacity batteries, which include a pack having multiple connected battery cells, are widely used as power supplies for hybrid vehicles, for example.

The secondary battery may be manufactured in various shapes, but is typically made in a cylindrical shape or a prismatic shape. The secondary battery may be manufactured by inserting an electrolyte and an electrode assembly in a case. The electrode assembly may be formed by disposing a separator as an insulator between a positive electrode plate and a negative electrode plate. A cap assembly, having electrode terminals, may be coupled to the case.

An arc may occur in the secondary battery when a fuse part is melted by an external short circuit. The arc generated at the fuse part of a conventional secondary battery may be transferred to other regions of the secondary battery, causing fire or explosion. Accordingly, a secondary battery having improved safety against an external short circuit is needed.

SUMMARY

One or more embodiments may provide a secondary battery, including: an electrode assembly, including a first electrode plate, a second electrode plate, and a separator between the first electrode plate and the second electrode plate; a first collector electrically connected to the first electrode plate, the first collector including a fuse part; a case accommodating the electrode assembly and the first collector; a cap plate sealing an opening of the case and electrically connected to the first collector, the cap plate including a short circuit hole, the short circuit hole being adjacent to the fuse part; a first short circuit member in the short circuit hole; and a second short circuit member spaced apart from a top surface of the cap plate and electrically connected to the second electrode plate, at least a portion of the second short circuit member overlapping the first short circuit member.

The fuse part may be located at a region corresponding to a center of the cap plate. The fuse part may be configured to actuate the first short circuit member using gas generated by an arc formed at the fuse part. A cross-sectional area of the fuse part may be less than that of all other portions of the first collector. The fuse part may have a smaller width or a smaller thickness than that of all other portions of the first collector. The fuse part may have a smaller width and a smaller thickness than that of all other portions of the first collector.

The first short circuit member may be bendable and configured to electrically contact the second short circuit member when an internal pressure of the secondary battery exceeds a preset pressure.

The first collector may include a first connecting part electrically connected to the cap plate, the first connection part including the fuse part formed therein; and a first extending part extending from the first connecting part and coupled to the first electrode plate. The first connecting part may include a connecting plate having a first end connected to the first extending part and a second end connected to the fuse part; and a coupling part coupled to the cap plate and the second end of the connecting plate, the coupling part electrically connecting the fuse part and the cap plate. The secondary battery may further include an insulating plate on an upper side of the connecting plate. The coupling part may be welded to a bottom surface of the cap plate.

The secondary battery may further include a first electrode terminal electrically connected to the cap plate. The first electrode terminal may be welded to a top surface of the cap plate.

A protection member may be disposed under the fuse part. The protection member may be fixed to an inner wall of the case. The protection member may include: a bottom part; and a sidewall part protruding toward the cap plate from the bottom part, the sidewall part extending along a periphery of the bottom part. The protection member may include first and second adjacent parts, the first part being directly below the fuse part, and the second part being directly below the first short circuit member and including a gas hole.

The secondary battery may further include a second electrode terminal electrically connected to the second electrode plate and the second short circuit member. The secondary battery may further include a second collector electrically connecting the second electrode plate and the second electrode terminal.

The second collector may include: a second connecting part coupled to the second electrode terminal; and a second extending part extending from the second connecting part and coupled to the second electrode plate.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
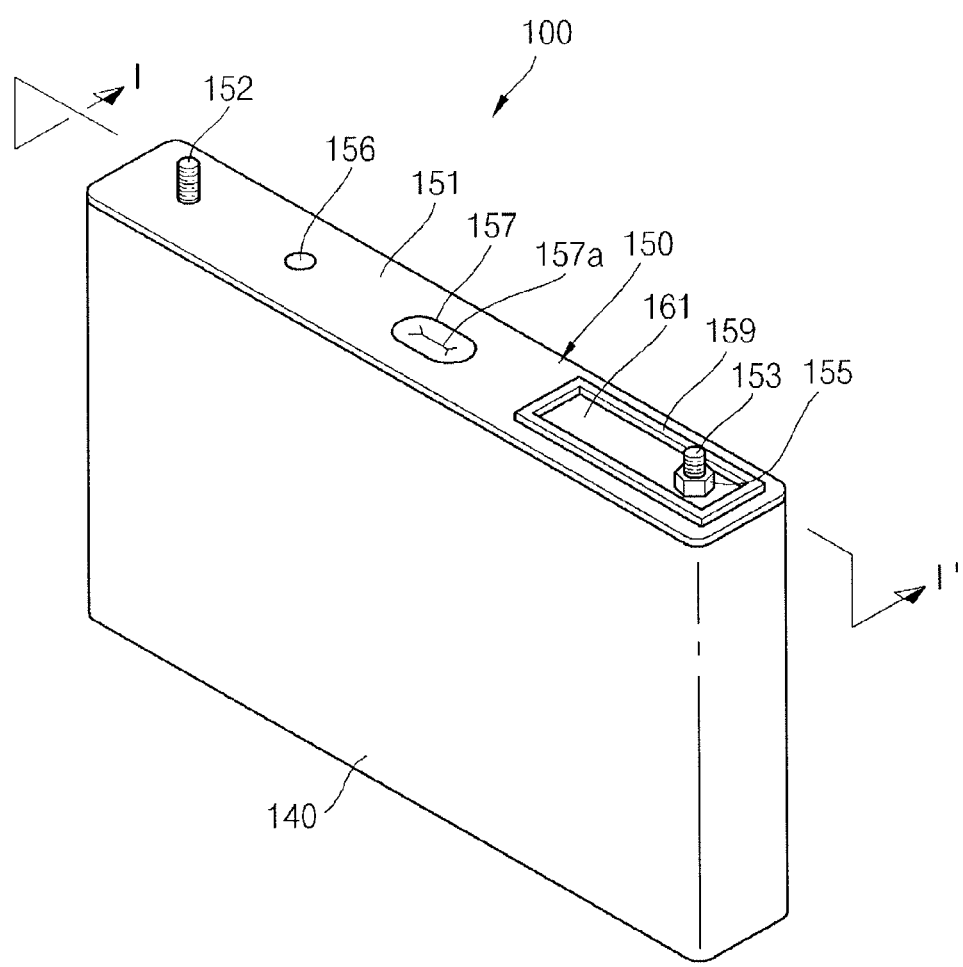
FIG. 1 illustrates a perspective view of a secondary battery according to an embodiment.

Korean Patent Application No. 10-2011-0116539 filed on Nov. 9, 2011, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
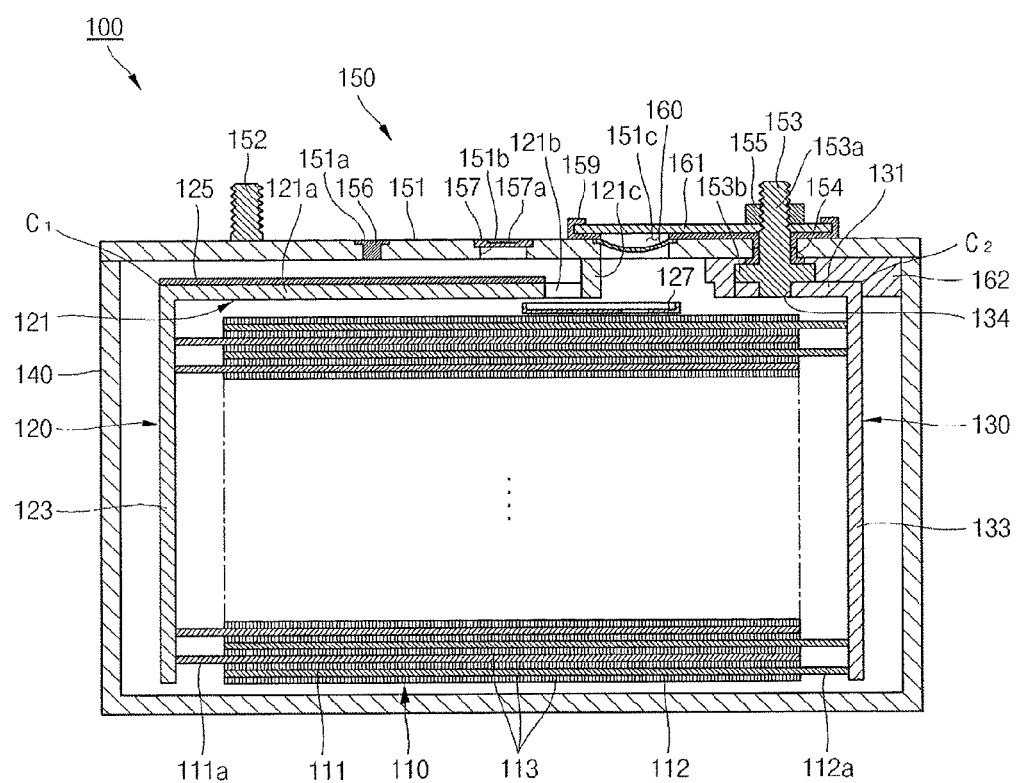
FIG. 2 illustrates a cross-sectional view of the secondary battery, taken along the line I-I' of FIG. 1.

FIG. 1 illustrates a perspective view of a secondary battery according to an embodiment. FIG. 2 illustrates a cross-sectional view of the secondary battery, taken along the line I-I' of FIG. 1.

Referring to FIGS. 1 and 2, the secondary battery 100 may include an electrode assembly 110, a first collector 120, a second collector 130, a case 140, a cap assembly 150, a first short circuit member 160, and a second short circuit member 161.

The electrode assembly 110 may be fabricated by winding or stacking a first electrode plate 111, a separator 113 and a second electrode plate 112, each of which include thin plates or layers. According to some embodiments, the first electrode plate 111 may function as a positive electrode and the second electrode plate 112 may function as a negative electrode.

The first electrode plate 111 may be formed by applying a first electrode active material (e.g., a transition metal oxide) on at least a portion of a first electrode collector. The first electrode collector may include metal foil (e.g., aluminum foil). The first electrode plate 111 may include a first electrode non-coating portion 111a on which the first electrode active metal is not applied. The first electrode non-coating portion 111a may function as a passage for current to travel from the first electrode plate 111 to an area outside of the first electrode plate 111. The material included in the first electrode plate 111 may not be limited to the transition metal oxide and a metal foil described above. For example, the first electrode plate 111 may include other materials having the same or similar function as the transition metal oxide and the metal foil.

The second electrode plate 112 may be formed by applying a second electrode active material (e.g., graphite or carbon) on a second electrode collector. The second electrode collector may include metal foil (e.g., nickel or copper foil). The second electrode plate 112 may include a second electrode non-coating portion 112a on which the second electrode active metal is not applied. The second electrode non-coating portion 112a may function as a passage for current to travel from the second electrode plate 112 to an area outside of the second electrode plate 112. The materials included in the second electrode 112 are not limited to the metal foil and graphite or carbon described above. For example, other materials having the same or similar functions as the metal foil, and graphite or carbon may be used.

In an implementation, the first and second electrode plates 111 and 112 may reverse polarities with each other, e.g., may have opposite polarities.

The separator 113 may be disposed between the first electrode plate 111 and the second electrode plate 112 to reduce the possibility of and/or prevent a short circuit, and to facilitate movement of lithium ions. The separator 113 may include, e.g., a polymer such as polyethylene, or a composite film of polypropylene and polyethylene. However, the material of the separator 113 is not limited to polyethylene or a composite film.

A first collector 120 and a second collector 130 may be coupled with ends of the electrode assembly 110. For example, the first collector 120 may be electrically connected to the first electrode plate 111, and the second collector 130 may be electrically connected to the second electrode plate 112.

The first collector 120 may include a conductive material, e.g., aluminum or aluminum alloy. The first collector 120 may contact, e.g., may be directly coupled or connected to, the first electrode non-coating portion 111a protruding from a first end of the electrode assembly 110. The first collector 120 may, thereby, be electrically connected to the first electrode plate 111. The first collector 120 may include a first connecting part 121 and a first extending part 123. The first connecting part 121 may include a connecting plate 121a, a fuse part 121b and a coupling part 121c. A configuration of the first collector 120 is described below in detail.

The second collector 130 may include a conductive material, e.g., copper, a copper alloy, nickel, or a nickel alloy. The second collector 130 may contact, e.g., may be directly coupled or connected to, the second electrode non-coating portion 112a protruding from a second end of the electrode assembly 110. The second collector 130 may include a second connecting part 131 and a second extending part 133. The second connecting part 131 may include a second terminal hole 134. A configuration of the second collector 130 is described below.

The case 140 may include a conductive metal, e.g., aluminum, aluminum alloy, or steel plated with nickel. The case 140 may have an approximately hexahedral shape with an opening through which the electrode assembly 110, the first collector 120, and the second collector 130 may be placed within the case 140. FIG. 2 illustrates the case 140 and the cap assembly 150 assembled together. The opening on the side of the case 140 is not shown. Although not shown, the opening may correspond in position to a periphery of the cap assembly 150.

An inner surface of the case 140, e.g., a cavity within the case 140, may be treated so that the case 140 is electrically insulated from the electrode assembly 110, the first and second collectors 120 and 130, and the cap assembly 150. The case 140 may have a polarity, e.g., a positive polarity.

The cap assembly 150 may be coupled to the case 140. The cap assembly 150 may include a cap plate 151, a first electrode terminal 152, a second electrode terminal 153, a gasket 154, and nuts 155. The cap assembly 150 may further include a plug 156, a vent plate 157, a connection plate 158, an upper insulation member 159, a first short circuit member 160, a second short circuit member 161, and a lower insulation member 162.

The cap plate 151 may close the opening of the case 140. The cap plate may have a short-circuit hole 151c extending therethrough. The cap plate 151 may include the same material as that included in the case 140. In an implementation, the cap plate 151 and the case 140 may have the same polarity.

The first electrode terminal 152 may be welded to a top surface of the cap plate 151 and may, thereby, be connected to the cap plate 151. The first electrode terminal 152 may be integrally formed with the cap plate 151. The first electrode terminal 152 may have a generally column-like shape. For example, the first electrode terminal 152 may include a base portion that directly contacts the upper surface of the cap plate 151, and a column portion that extends from the base portion. The base portion may have a diameter that is greater than a diameter of the column portion. The first electrode terminal 152 may extend substantially outside of the case 140 from a first end of the cap plate 151. A thread may be formed on an outer surface of an upper part, e.g., the column portion, of the first electrode terminal 152.

The second electrode terminal 153 may extend through a second, opposing end of the cap plate 151, and may be electrically connected to the second collector 130. The second electrode terminal 153 may have a generally column-like shape. For example, the second electrode terminal 153 may have a column portion 153a extending through the cap plate 151. The column portion 153a may have an upper part that is exposed, i.e., extends outside of the case 140, and a lower part that extends within the case. A thread may be formed on the upper, exposed part of the column portion 153a. A flange 153b may extend horizontally from the lower part of the column portion 153a. The flange 153b may correspond in position to a lower side of the cap plate 151, i.e., may be below the cap plate 151. The flange 153b may prevent removal of the second electrode terminal 153 from the cap plate 151. A bottom end of the column portion 153a may be fitted into the second terminal hole 134 of the second collector 130. The second electrode terminal 153 may be insulated from the cap plate 151.

The gasket 154 may be formed of an electrically insulating material and may be disposed between the second electrode terminal 153 and the cap plate 151 to seal a space between the second electrode terminal 153 and the cap plate 151. The gasket 154 may reduce or prevent ingress of external moisture into the secondary battery 100 and/or leakage of the electrolyte from the secondary battery 100.

The nut 155 may be engaged with the thread on the second electrode terminal 153, e.g., on the upper, exposed part of the column portion 153a, and may secure the second electrode terminal 153 to the cap plate 151.

The plug 156 may close an electrolyte injection hole 151a of the cap plate 151. The vent plate 157 may be disposed on a vent hole 151b of the cap plate 151 and a notch 157a may be formed in the vent plate 157 to facilitate opening of the vent plate 157 in response to a preset pressure.

The upper insulation member 159 may be disposed between the second electrode terminal 153 and the cap plate 151 to further secure the second electrode terminal 153 to the cap plate 151. The upper insulation member 159 may be tightly coupled with the gasket 154 to provide an airtight seal between the cap plate 151 and the second electrode terminal 153. The upper insulation member 159 may insulate the second terminal plate 153 from the cap plate 151.

The lower insulation member 162 may be disposed between the second collector 130 and the cap plate 151. The lower insulation member 162 may reduce or prevent an undesirable short circuit between the second collector 130 and the cap plate 151.

The first short circuit member 160 may be disposed at the short circuit hole 151c of the cap plate 151 and may have the same polarity as that of the cap plate 151.

The first short circuit member 160 may be an inversion plate, e.g., a bendable plate, having a pair of opposing ends that are fixed to the cap plate 151 and a downwardly convex round part, e.g., a curved part, extending between the two opposing ends. The round part of the first short circuit member 160 may protrude toward an internal cavity of the case 140 when an internal pressure of the secondary battery 100 is within a preset value. When the internal pressure of the secondary battery 100 exceeds the preset pressure (e.g., due to over-charge or external short circuit), the round part of the first short circuit member 160 may be inverted to convexly protrude upwardly, e.g., protrude away from the internal cavity of the case 140.

The external short circuit, as used herein, refers to a short caused by an external conductive material to the first electrode terminal 152 and the portion of the second electrode terminal 153 that is exposed, e.g., extends outside of the case 140.

The second short circuit member 161 may be disposed on an exterior of the cap plate 151. The second short circuit member 161 may be spaced apart from the cap plate 151, e.g., may be on the upper insulation member 159. The second electrode terminal 153 may be fitted into the second short circuit member 161, e.g., may extend through the second short circuit member 161. The second short circuit member 161 may extend over and cover the short circuit hole 151c. For example, the short circuit member 161 may cover the entirety or a portion of the short circuit hole 151c, e.g., overlapping the entirety or at least a portion of the first short circuit member 160. The second short circuit member 161 may be electrically connected to the second electrode terminal 153.

The second short circuit member 161 may contact the first short circuit member 160 when the first short circuit member 160 convexly protrudes upwardly, e.g., protrudes away from the case, in response to an increase in the internal pressure of the secondary battery 100 above a preset pressure (e.g., due to over-charge or external short circuit). When the second short circuit member 161 contacts the first short circuit member 160, a short circuit of the second short circuit member 161 may be induced.

For example, when a large amount of current and heat is generated, the fuse part 121b may be broken, thereby electrically disconnecting the secondary battery 100. In addition, a first current path may be formed in the secondary battery 100 toward the second electrode terminal 153, the second collector 130, the electrode assembly 110, the first collector 120, the cap plate 151 and the first electrode terminal 152. When the fuse part 121b in the first collector 120 melts, an arc may occur in the secondary battery 100. Gas may be generated by the arc.

It should be noted that the fuse part 121b, according to embodiments, may be positioned adjacent the first short circuit member 160, e.g., adjacent the short circuit hole 151c within which the first short circuit member 160 extends. The physical proximity of the first short circuit member 160 to the fuse part 121b may facilitate the direct transfer of gas that is instantaneously generated at the fuse part 121b of the first collector 120, to the first short circuit member 160. Thus, pressure derived from the generated gas may be concentrated on the first short circuit member 160 within a short time. The configuration of the fuse part 121b is described below in further detail.

When an internal pressure derived from the gas generated at the fuse part 121b exceeds a preset pressure, the first short circuit member 160 may be inverted to be shorted from the second short circuit member 161. Thus, in addition to the first current path, a second current path may be formed through the second electrode terminal 153, the second short circuit member 161, the first short circuit member 160 and the case 140 due to a short circuit of the first short circuit member 160 and the second short circuit member 161. As a result, an amount of current concentrated on the fuse part 121b of the first collector 120 may be reduced. According to some embodiments, the reduction of current concentrated on the fuse part 121b may prevent an arc from being generated.

In the conventional secondary battery, a fuse part is positioned at a side of a case (rather than adjacent to a short circuit member). For example, a short circuit member is formed close to a second electrode terminal, and a connecting plate is long enough to allow a fuse part to be positioned at a region corresponding to a center of a cap plate, i.e., a region under the center of the cap plate. If an external short circuit is generated in the conventional secondary battery having a fuse part positioned at a side of the case, the internal pressure of the case may increase due to arc gas, i.e., gas generated at the arc. The arc generated at the fuse part may be transferred, e.g., to other regions of the secondary battery, before the short circuit member may operate. Thus, the short circuit member may not operate normally. For example, in the conventional secondary battery (having the fuse part positioned at a side of the case), a hole may be formed in the case due to transfer of the arc to other regions of the secondary battery. The gas, e.g., generated at the arc, may be discharged outside of the case through the hole formed in the case. Eventually, the pressure remaining in the case may not be sufficient to permit the short circuit member to operate normally.

In contrast, according to some embodiments, a transfer path of the arc gas may be shortened by forming the fuse part 121b at a location adjacent to the first short circuit member 160. Accordingly, the time required to operate the first short circuit member 160 may be reduced. Therefore, in the secondary battery 100, the gas generated at the fuse part 121b may rapidly induce a short circuit to the first short circuit member 160 and the second short circuit member 161 before a hole may be formed in the case 140 as described above. Accordingly, improved protection in response to an external short circuit may be achieved.

Configurations of the first collector 120, the protection member 127 and the second collector 13 is described in detail below with reference to the accompanying drawings.

Figure 3:
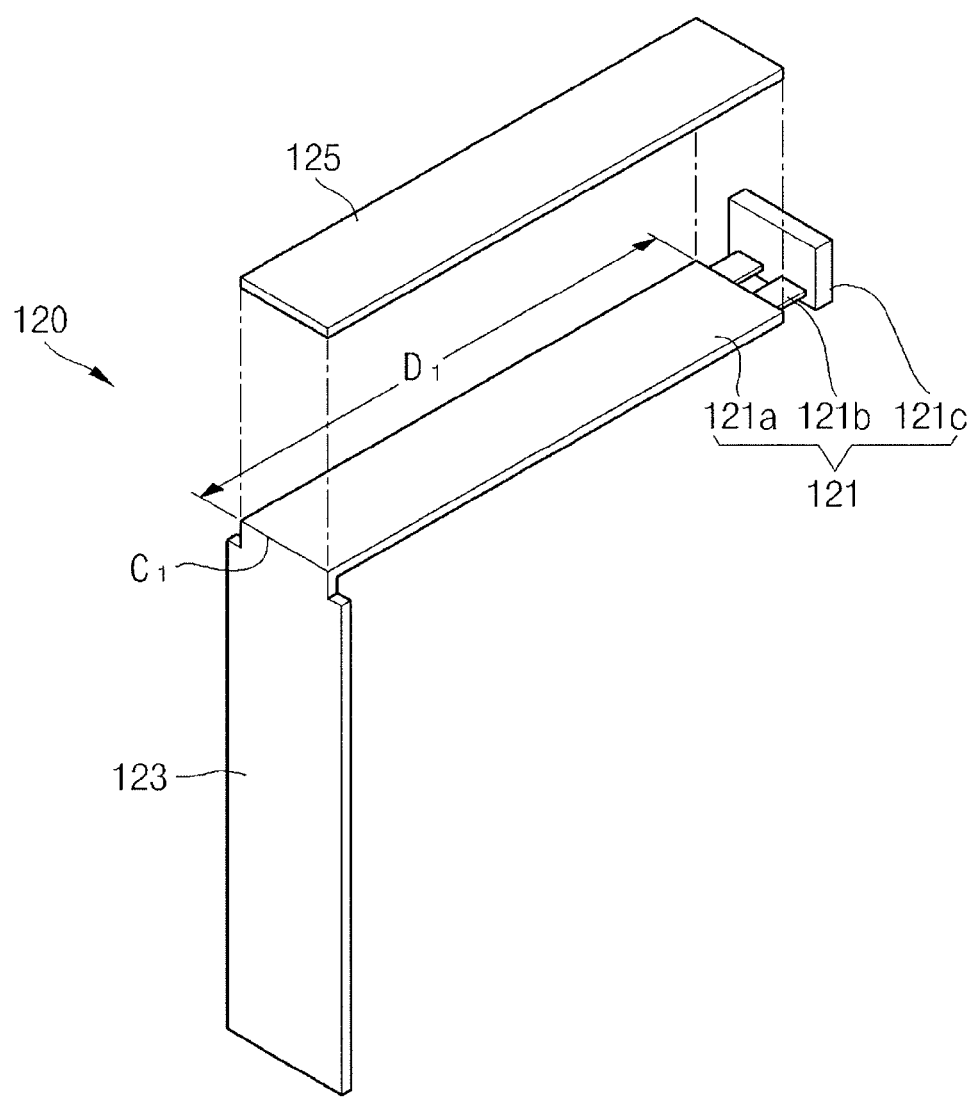
FIG. 3 illustrates a perspective view of a first collector according to an embodiment.

FIG. 3 illustrates a perspective view of a first collector 120 according to an embodiment.

Referring to FIG. 3, the first collector 120 may include a first connecting part 121 and a first extending part 123. The first connecting part 121 may include a connecting plate 121a, a fuse part 121b and a coupling part 121c.

One end of the connecting plate 121a may be connected to the first extending part 123 and an opposing end of the connecting plate 121a may be connected to a first end of the fuse part 121b. A first terminal hole 124 may be formed in the connecting plate 121a. The first terminal hole 124 may provide a space into which the first electrode terminal 152 of the cap assembly 150 may be inserted. An insulating plate 125 may be disposed on a top surface of the connecting plate 121a. The insulating plate 125 may prevent unnecessary electrical contact between the connecting plate 121a and the cap plate 151. The first collector 120 may be connected to a cap plate 151 through the coupling part 121c. As such, the first collector 120 may be electrically connected to the first electrode terminal 152. Therefore, an electrical contact area of the first collector 120, other than the coupling part 121c, may be reduced by disposing the insulating plate 125 between the connecting plate 121a and the cap plate 151.

A length D1 of the connecting plate 121a may be long enough to allow the fuse part 121b to be positioned adjacent to the first short circuit member 160. Thus, the length D1 of the connecting plate 121a or the location of the fuse part 121b may vary depending on the position at which the first short circuit member 160 is formed. According to the embodiments, the first collector 120 may be indirectly connected to the first electrode terminal 152 through the cap plate 151. As such, the length D1 of the connecting plate 121a or the location of the fuse part 121b may not be restricted to a particular position under the cap plate 151.

A second end of the fuse part 121b may be connected to a side surface of the coupling part 121c. The fuse part 121b may have a cross-sectional area smaller than that of all other portions of the first collector 120. In addition, the connecting plate 121a may have a smaller width or thickness than that of other portions of the first collector 120

As described above, the fuse part 121b may be formed adjacent the first short circuit member 160. As such, a pressure, derived from gas that is instantaneously generated when an external short circuit occurs in the secondary battery 100, may be applied to the first short circuit member 160, which may be rapidly and easily operated. The fuse part 121b may be located at a region below the center of the cap plate 151. However, the location at which the fuse part 121b may be formed may vary according to the location of the first short circuit member 160. According to some embodiments, the fuse part 121b may be positioned adjacent the first short circuit member 160.

The side surface of the coupling part 121c may be connected to the second end of the fuse part 121b, and a top surface of the coupling part 121c may be connected to a bottom surface of the cap plate 151. Referring back to FIG. 2, the top surface of the coupling part 121c may be welded to the bottom surface of the cap plate 151 to facilitate electrical connection to the cap plate 151. Therefore, the first collector 120 may be electrically connected to the first electrode terminal 152 through the cap plate 151 and may be integrally formed with the cap plate 151.

The first extending part 123 may include a bent portion, e.g., a narrow top portion, extending from a wide bottom portion. The first extending part 123 may be coupled to an end of the first connecting part 121 at one end and may substantially contact the first electrode non-coating portion 111a at an opposing end. The first extending part 123 may be plate-shaped. A corner of the first collector 120, at which the ends of the first connecting part 121 and the first extending part 123 meet, is denoted by reference symbol 'C1.' The first connecting part 121 and the first extending part 123 may be perpendicular to each other with respect to the corner C.

Figure 4:
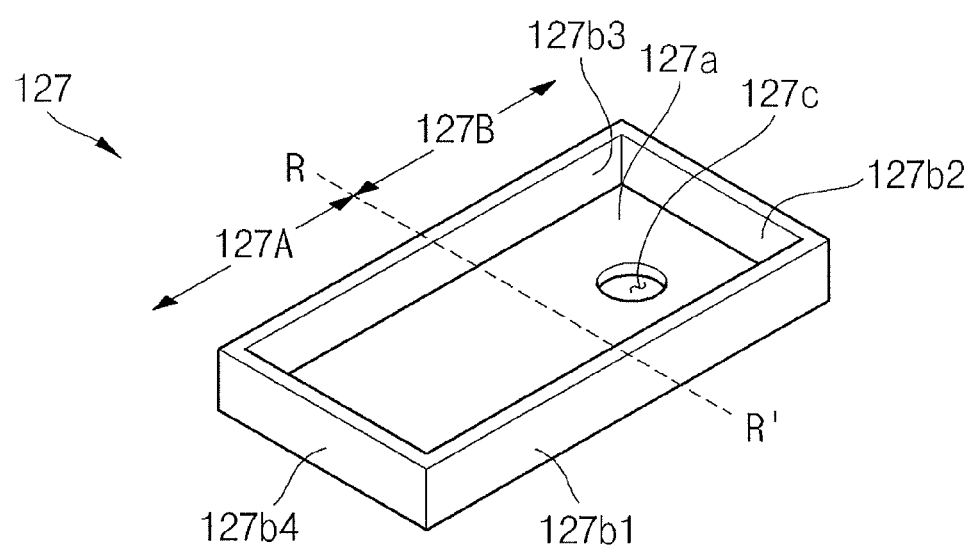
FIG. 4 illustrates a perspective view of a protection member according to an embodiment.

FIG. 4 illustrates a perspective view of a protection member 127 according to an embodiment.

Referring to FIGS. 2 and 4, the protection member 127 may be disposed under the fuse part 121b, and may include a bottom part 127a and first, second, third, and fourth sidewall parts 127b1, 127b2, 127b3, and 127b4, respectively, which extend from the bottom part 127a. As shown in FIG. 4, the bottom part 127a of the protection member 127 may have a rectangular, plate shape. The first, second, third, and fourth sidewall parts 127b1, 127b2, 127b3, and 127b4 may extend along the periphery of the bottom part 127a and may protrude toward the cap plate 151. FIG. 2 illustrates only sectional views of the protection member 127 and the case 140 when the protection member 127 and the case 140 are assembled together. Although not shown, two of the first, second, third, and fourth sidewall parts 127b1, 127b2, 127b3 and 127b4, may be fixed to inner walls of the case 140 and the protection member 127 may be installed within the case 140. For example, the second and fourth sidewall parts 127b2 and 127b4 may be welded to two inner sidewalls of the case 140. As such, the protection member 127 may be coupled to the case 140. The protection member 127 may protect the electrode assembly 110 against residues generated when the fuse part 121b melts as a result of an arc occurring at the fuse part 121b.

In addition, the protection member 127 may include a part that is directly below the fuse part 121b and a part that is directly below the first short circuit member 160. Therefore, as shown in FIG. 4, the protection member 127 may be divided into a first part 127A positioned under the fuse part 121b and a second part 127B positioned under the first short circuit member 160. A gas hole 127c may be formed in the second part 127B. The protection member 127, e.g., the gas hole 127c, may provide a path through which gas generated from the electrode assembly 110 due to over-charge of the secondary battery 100 may smoothly move to the first short circuit member 160. In addition, the protection member 127 may protect the electrode assembly 110 against the residues generated by the arc occurring to the fuse part 121b more stably.

Figure 5:
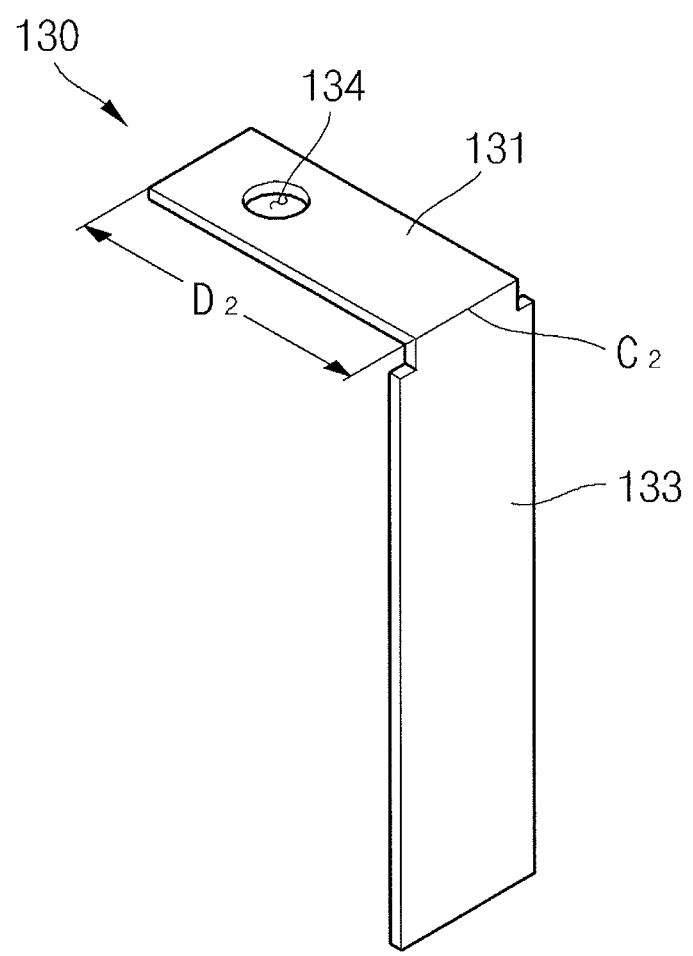
FIG. 5 illustrates a perspective view of a second collector according to an embodiment.

FIG. 5 illustrates a perspective view of a second collector 130 according to an embodiment.

Referring to FIG. 5, the second collector 130 may include a second connecting part 131 and a second extending part 133.

The second connecting part 131 may be disposed between an upper portion of the electrode assembly 110 and a lower portion of the cap assembly 150 and may have a plate shape. A second terminal hole 134 may be formed in the second connecting part 131. The second terminal hole 134 may provide a space into which the second electrode terminal 153 of the cap assembly 150 may be inserted. A length D2 of the second connecting part 131 may, for example, be shorter than the length D1 of the connecting plate 121a of the first connecting part 121.

The second extending part 133 may include a bent portion, e.g., a narrow top portion, extending from a wide bottom portion. The second extending part 133 may be coupled to, e.g., contact, the second connecting part 131 at one end and may contact the second electrode non-coating portion 112a at an opposing end. The second extending part 133 may be plate-shaped. A corner of the second collector 130, at which the ends of the second connecting part 131 and the second extending part 133 meet, is denoted by reference symbol 'C2.' The second connecting part 131 and the second extending part 133 may be perpendicular to each other with respect to the corner C2.

The secondary battery 100 according to embodiments may provide improved safety against external short circuit or overcharge.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly, including a first electrode plate, a second electrode plate, and a separator between the first electrode plate and the second electrode plate;
   a first collector electrically connected to the first electrode plate, the first collector including a fuse part;
   a case accommodating the electrode assembly and the first collector;
   a cap plate sealing an opening of the case and electrically connected to the first collector, the cap plate including a short circuit hole, the short circuit hole being adjacent to the fuse part;
   a first short circuit member in the short circuit hole; and
   a second short circuit member spaced apart from a top surface of the cap plate and electrically connected to the second electrode plate, at least a portion of the second short circuit member overlapping the first short circuit member.

2. The secondary battery as claimed in claim 1, wherein the fuse part is located at a region corresponding to a center of the cap plate.

3. The secondary battery as claimed in claim 1, wherein the fuse part is configured to actuate the first short circuit member using gas generated by an arc formed at the fuse part.

4. The secondary battery as claimed in claim 1, wherein a cross-sectional area of the fuse part is less than that of all other portions of the first collector.

5. The secondary battery as claimed in claim 4, wherein the fuse part has a smaller width or a smaller thickness than that of all other portions of the first collector.

6. The secondary battery as claimed in claim 4, wherein the fuse part has a smaller width and a smaller thickness than that of all other portions of the first collector.

7. The secondary battery as claimed in claim 1, wherein the first short circuit member is bendable and configured to electrically contact the second short circuit member when an internal pressure of the secondary battery exceeds a preset pressure.

8. The secondary battery as claimed in claim 1, wherein the first collector includes:
   a first connecting part electrically connected to the cap plate, the first connecting part including the fuse part formed therein; and
   a first extending part extending from the first connecting part and coupled to the first electrode plate.

9. The secondary battery as claimed in claim 8, wherein the first connecting part includes:
   a connecting plate having a first end connected to the first extending part and a second end connected to the fuse part; and
   a coupling part coupled to the cap plate and the second end of the connecting plate, the coupling part electrically connecting the fuse part and the cap plate.

10. The secondary battery as claimed in claim 9, further including an insulating plate on an upper side of the connecting plate.

11. The secondary battery as claimed in claim 9, wherein the coupling part is welded to a bottom surface of the cap plate.

12. The secondary battery as claimed in claim 1, further comprising a first electrode terminal electrically connected to the cap plate.

13. The secondary battery as claimed in claim 12, wherein the first electrode terminal is welded to a top surface of the cap plate.

14. The secondary battery as claimed in claim 1, further comprising a protection member disposed under the fuse part.

15. The secondary battery as claimed in claim 14, wherein the protection member is fixed to an inner wall of the case.

16. The secondary battery as claimed in claim 14, wherein the protection member includes:
   a bottom part; and
   a sidewall part protruding toward the cap plate from the bottom part, the sidewall part extending along a periphery of the bottom part.

17. The secondary battery as claimed in claim 14, wherein the protection member includes first and second adjacent parts, the first part being directly below the fuse part and the second part being directly below the first short circuit member and including a gas hole.

18. The secondary battery as claimed in claim 1, further comprising a second electrode terminal electrically connected to the second electrode plate and the second short circuit member.

19. The secondary battery as claimed in claim 18, further comprising a second collector electrically connecting the second electrode plate and the second electrode terminal.

20. The secondary battery as claimed in claim 19, wherein the second collector includes:
- a second connecting part coupled to the second electrode terminal; and
- a second extending part extending from the second connecting part and coupled to the second electrode plate.

* * * * *